(12) United States Patent
Stone et al.

(10) Patent No.: US 9,973,565 B2
(45) Date of Patent: May 15, 2018

(54) TEMPORARY APPLICATIONS FOR MOBILE DEVICES

(71) Applicant: Samsung Electronics Co., Ltd., Suwon-si, Gyeonggi-do (KR)

(72) Inventors: Glen D. Stone, Los Gatos, CA (US); Mahfuzur Rahman, San Jose, CA (US); Alan Messer, Los Gatos, CA (US); Russell A. Berkoff, Sunnyvale, CA (US); Paul N. Fahn, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 14/205,977

(22) Filed: Mar. 12, 2014

(65) Prior Publication Data

US 2014/0330881 A1 Nov. 6, 2014

Related U.S. Application Data

(60) Provisional application No. 61/820,116, filed on May 6, 2013, provisional application No. 61/820,117, filed on May 6, 2013.

(51) Int. Cl.
*G06F 15/16* (2006.01)
*H04L 29/08* (2006.01)
(Continued)

(52) U.S. Cl.
CPC ............ *H04L 67/10* (2013.01); *G06Q 30/02* (2013.01); *G06Q 30/0241* (2013.01);
(Continued)

(58) Field of Classification Search
CPC ......... H04L 67/10; H04L 67/16; H04L 67/18; G06Q 30/00; H04W 4/206; H04W 4/001; H04W 4/003
(Continued)

(56) References Cited

U.S. PATENT DOCUMENTS 6,477,550 B1 11/2002 Balasubramanian et al.
7,130,622 B2 10/2006 Vanska et al.
(Continued)

FOREIGN PATENT DOCUMENTS

EP 1 770 956 4/2007

OTHER PUBLICATIONS

Enterprise Micro Application Technical User Guide, SAP Imagineering, version 1.3, Feb. 2010.

*Primary Examiner* — Joseph L Greene
(74) *Attorney, Agent, or Firm* — Beyer Law Group LLP

(57) ABSTRACT

Various embodiments relate to a cloud-based temporary app management system. In one aspect of the invention, a cloud service provides a temporary app from a vendor. The temporary app is a mobile application that is temporarily accessible on a mobile device when a designated event (e.g. a change in the location or surroundings of the mobile device, a particular type of data stored in the mobile device, etc.) is detected by a mobile device. The cloud service receives event information from the mobile device. The event information indicates an event detected by the mobile device. The cloud service then determines whether to make the temporary app accessible on the mobile device based on an analysis of the designated event and the event information received from the mobile device.

22 Claims, 10 Drawing Sheets

(51) Int. Cl.
*H04W 4/00* (2018.01)
*H04W 4/20* (2018.01)
*G06Q 30/02* (2012.01)

(52) U.S. Cl.
CPC ......... *G06Q 30/0267* (2013.01); *H04L 67/16* (2013.01); *H04L 67/18* (2013.01); *H04W 4/001* (2013.01); *H04W 4/003* (2013.01); *H04W 4/206* (2013.01)

(58) Field of Classification Search
USPC ........................................................ 709/201
See application file for complete search history.

(56) References Cited

U.S. PATENT DOCUMENTS

| | | | |
|---|---|---|---|
| 7,438,215 B2 | 10/2008 | Silverbrook et al. | |
| 7,880,911 B2 | 2/2011 | Silverbrook et al. | |
| 7,920,854 B2 | 4/2011 | Silverbrook et al. | |
| 8,516,076 B2 | 8/2013 | Thomas | |
| 2007/0064259 A1 | 3/2007 | Silverbrook et al. | |
| 2012/0054178 A1 | 3/2012 | Tran et al. | |
| 2012/0278209 A1 | 11/2012 | Tran et al. | |
| 2012/0278736 A1 | 11/2012 | Tran et al. | |
| 2012/0278821 A1 | 11/2012 | Tran et al. | |
| 2013/0040626 A1* | 2/2013 | Morgaine | H04W 4/00 455/418 |
| 2013/0104146 A1 | 4/2013 | Yadav et al. | |
| 2013/0210404 A1* | 8/2013 | Curtis | H04L 67/34 455/418 |
| 2013/0345961 A1* | 12/2013 | Leader | G01C 21/3617 701/410 |
| 2014/0019867 A1* | 1/2014 | Lehtiniemi | G06Q 50/01 715/738 |
| 2014/0156704 A1* | 6/2014 | Jenkins | G06F 17/30241 707/772 |

\* cited by examiner

TEMPORARY APPLICATIONS FOR MOBILE DEVICES

This application claims priority of Provisional Application Nos. 61/820,116 filed May 6, 2013 and 61/820,117 filed May 6, 2013, each of which is incorporated herein by reference in its entirety for all purposes.

FIELD OF THE INVENTION

Background

Mobile devices, such as tablets and smartphones, have become increasingly popular. One reason for the popularity of mobile devices is their ability to run numerous applications. Mobile applications are executable software programs that are downloaded and installed onto a mobile device. A mobile device can store dozens of different applications that can address a wide variety of needs. As a result, a user can customize a mobile device by installing applications that are tailored to his or her interests.

Typically, to obtain a mobile application, a mobile device user needs to direct his or her mobile device to an online store. For example, a user of an Apple device, such as an iPad™ or iPhone™, can visit the App Store, which is provided by Apple Inc. A user of an Android™ phone or tablet can visit Google Play Store, which is provided by Google, Inc. These online stores provide hundreds of thousands of different applications covering a wide variety of subjects, from news and sports to maps and games. A user typically browses the many available applications at the online store, selects one and then downloads it from the online store to his or her mobile device. The selected application is then installed on the operating system for the mobile device and is accessible to the user. If the user wishes to later remove the application, the user must find the application in his or her mobile device and issue a command to delete the application.

Many mobile applications are context-specific. For example, a user can activate a jogging application to track running times, mileage, location and speed. Some applications allow a user to find nearby restaurants, receive information about special deals in the local area, or obtain interesting historical information about nearby landmarks. Generally, a user has to remember which application to use in any particular context and then has to find and activate the application in the mobile device.

Finding a suitable application for a particular situation can be a difficult and tedious task. Given the large number of available applications, it can be challenging for a user to find and install the best ones for different contexts and situations. Even if the user has installed the right applications for a particular situation or context, it can be inconvenient to find those applications on the fly, given that a user might have fifty or more applications on his or her mobile device.

There are several ongoing efforts to facilitate the selection and use of mobile applications. For example, Google Now is a mobile application that is preinstalled on many Android smartphones. Google Now, which is developed by Google, Inc., automatically provides information to a mobile phone user based on various parameters, including time and location. For example, Google Now can determine that a user of a smartphone is in traffic and is driving back home from work. Google Now may then suggest the use of an installed map application, which can provide alternate routes to the user.

SUMMARY

The present invention relates to systems, mobile devices and techniques for managing mobile applications. In one aspect of the invention, a cloud service provides a temporary app from a vendor. The temporary app is a mobile application that is temporarily accessible on a mobile device when a particular, designated event (e.g. a shift to a particular location, a particular characteristic in the environment around the mobile device, a particular type of data stored in the mobile device, etc.) is detected by the mobile device. The cloud service receives event information from the mobile device. The event information indicates a current event detected by the mobile device. The cloud service then determines whether to make the temporary app accessible on the mobile device based on an analysis of a designated event and the event information. In various implementations, if a designated event matches the event information sent from the mobile device, the cloud service makes the temporary app available on the mobile device.

The above temporary app management system may be implemented in a wide variety of ways, depending on the needs of a particular application. In some embodiments, for example, temporary apps are installed at their respective mobile devices when particular, designated events are detected, and automatically uninstalled when the events are not longer ongoing. In other embodiments, temporary apps are preloaded on mobile devices and hidden or revealed depending on events detected by the mobile device. Some designs involve an opportunity for a vendor to communicate in real time with the cloud service after a designated event is detected by a mobile device. The vendor can receive additional information about the mobile device user and use it to determine whether a temporary app should be sent and what kind of deals or special offerings should be made to the mobile device user.

In another aspect, a mobile device arranged to use temporary apps is described. The mobile device is arranged to transmit event information to a cloud service. This event information indicates that the mobile device has detected a designated event. The mobile device receives temporary app availability data from the cloud service. The temporary app availability data indicates that multiple temporary apps exist e.g., more than 1 temporary app are under consideration for installation at the mobile device. The mobile device analyzes the data stored at the mobile device. For example, the analyzed data could involve data obtained using sensors at the mobile device, a user profile, a history of actions on the mobile device, or any other suitable type of data. Based on the analysis of the data, the mobile device selects a subset of the temporary apps. In various embodiments, the mobile device requests that the selected temporary apps be downloaded from the cloud service so that they can be installed at the mobile device. Some implementations relate to executable computer code or software configured to perform any of the above operations, various server, mobile device and user interface designs.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
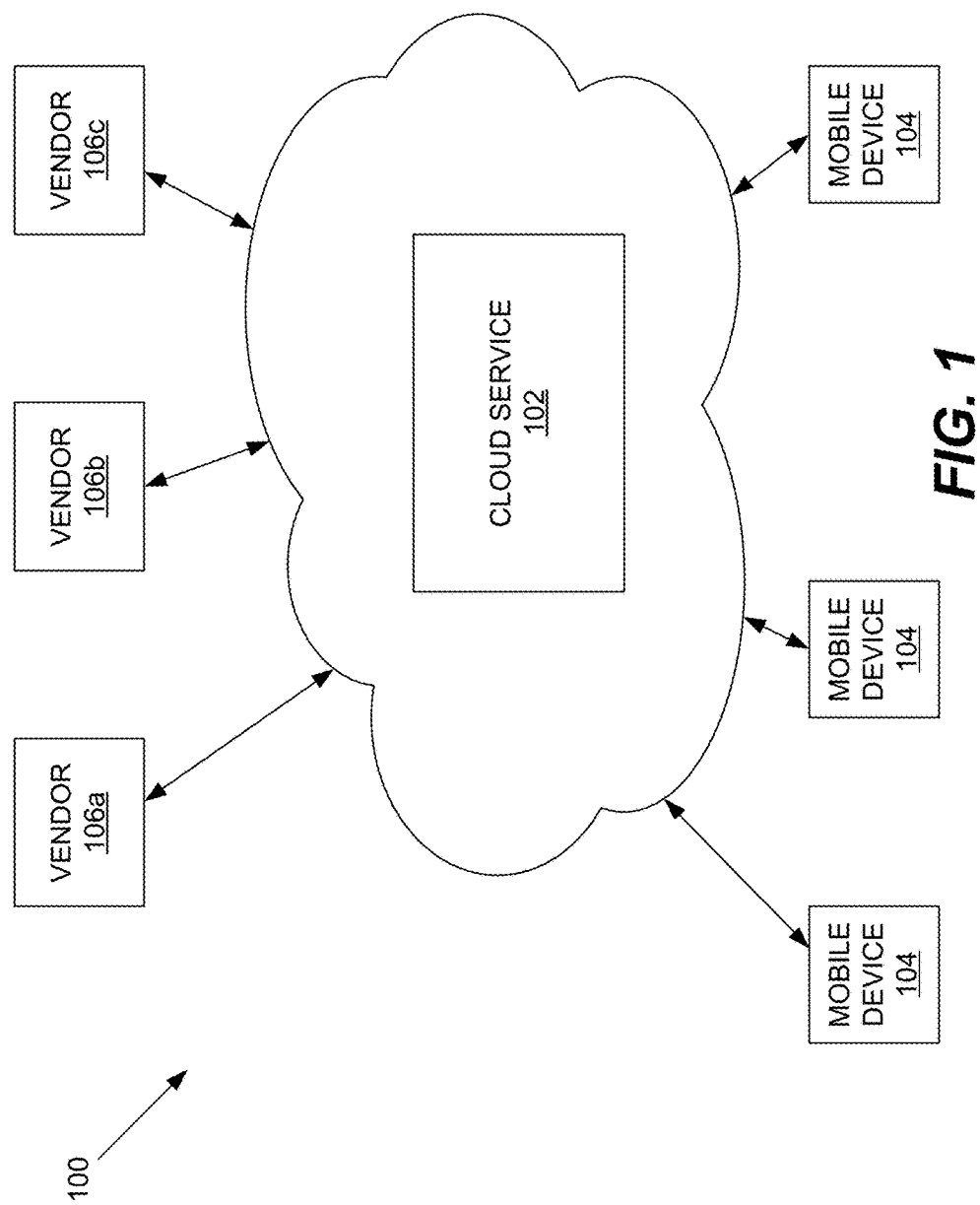
FIG. 1 is a block diagram illustrating a cloud-based temporary app management system according to a particular embodiment of the present invention.

The present invention relates to methods, devices and software for managing mobile applications and devices. More specifically, the present application relates to a particular type of mobile application that is referred to herein as a temporary app. A temporary app is a mobile application that is temporarily accessible on a mobile device, depending on whether the mobile device is detecting a particular, designated event.

As noted in the Background, it can be difficult and tedious for a user to find, install and activate the right applications for particular situations. If a user knows that he or she will encounter a particular event, the user may have to browse through dozens of applications at an online store to select and install the most helpful ones. Even if the user succeeds in downloading suitable applications, it is quite possible that the user will forget to use the application at the proper time. Additionally, although there are useful applications for a wide variety of situations, a user cannot anticipate every situation that will come up, and thus will often not have a suitable application installed beforehand.

Technology companies have developed various solutions to address some of the above problems. For example, some companies have developed mobile applications that monitor the movement, location or other characteristics of a mobile device. The mobile application uploads this information to a company server. In response, the company server sends back data, which the mobile application displays to the user. The mobile application Google Now provides such a service. One service of Google Now, for example, informs a user of nearby events (e.g., a sports event, a lecture or a concert) as the user and his or her mobile device move to different cities or locations.

Various embodiments of the present invention contemplate a different approach that allows temporary apps to be downloaded and/or accessed at a mobile device in response to various events. Various embodiments relate to a cloud-based delivery and management system for temporary apps. In some implementations, multiple vendors and companies provide temporary apps to a cloud service. The cloud service monitors multiple mobile devices, which are routinely transmitting data on events occurring around and within the mobile devices. For example, a mobile device may transmit data to the cloud-based system indicating that the mobile device has changed its location or that an earthquake or sports event has recently taken place. Alternatively, the mobile device may report that its user prefers a particular type of food, retailer, product or credit card, based on information stored at the mobile device. Such information can be obtained from a variety of sources, including any sensor data or data stored on the mobile device (e.g., calendar data, a shopping list, a user profile, a finance application that stores a history of payments and financial transactions, etc.)

In response, the cloud-based system allows mobile devices to automatically and quickly access particular temporary apps that are responsive to the reported events. In some embodiments, these temporary apps are immediately downloaded to their respective mobile devices so that their users can quickly access them. For example, if an earthquake has taken place, temporary apps may be sent to mobile devices in the afflicted area to help users find shelter, water and other emergency resources. Some implementations involve temporary apps that are arranged to automatically be deleted once the triggering event has ended, in order to help conserve storage space on the mobile devices.

The above approach offers a variety of benefits over conventional context-aware applications. For example, the functionality of current versions of Google Now (the context-aware application developed by Google, Inc.) is generally limited to the presentation of data (e.g., a weather report, scores in a sport event, traffic conditions) in response to an event, or the recommended usage of another, preinstalled application. Various embodiments of the present invention, however, can provide a wider range of features and functionality by allowing rapid access to full mobile applications in response to various events. Also, context-aware applications such as Google Now are typically either pre-installed on a particular device, or must be individually found and downloaded at an online application store. In some of the described embodiments, temporary apps from a wide variety of different companies and vendors are stored at a cloud service, and are then made available to mobile devices in response to events reported by those mobile devices. The use of a centralized cloud-based system allows vendors to easily deploy their temporary apps, and facilitates quick user access to a large, diverse array of applications.

Referring initially to FIG. 1, a cloud-based temporary app management system 100 according to a particular embodiment of the present invention will be described. The system 100 includes a cloud service 102, multiple mobile devices 104 and vendors 106a, 106b and 106c. The system 100 is arranged to manage the storage, delivery and deployment of temporary apps to suitable mobile devices. The components of the system are connected using any suitable telecommunications network or communications protocol, such as the Internet.

The vendors 106a-106c represent any suitable company, organization, individual or entity that is interested in deploying temporary apps. In the illustrated embodiment, temporary apps are software programs that are installed or made accessible at mobile devices only under certain conditions defined by the vendors. That is, the temporary app is accessible or installed at a mobile device if the mobile device detects a designated event. For example, a particular clothing retailer might be interested in installing a temporary app at a mobile device, but only when data stored at the mobile device (e.g., a finance application) indicates a history of transactions at the retailer and only when the mobile device detects (e.g., using GPS data) that it is close to one of the retailer's outlets. In addition to the temporary apps, the vendors generally provide the associated temporary app usage requirements and conditions (sometimes referred to herein as a temporary app usage policy) to the cloud service 102.

The cloud service 102 is any suitable device or network of devices that are arranged to manage and/or deliver temporary apps. In the illustrated embodiment, the cloud service 102 includes one or more servers. The cloud service 102 receives the temporary apps and their corresponding temporary app activation policies from the vendors and stores them in the servers. The cloud service 102 is arranged to follow the policies of the vendors in determining when and how to deliver any temporary apps to mobile devices. To help make this determination, the cloud service 102 is also arranged to obtain event information from mobile devices 104. This event information provides information about each mobile device, the mobile device user and/or the environment around the mobile device.

Each mobile device 104 is any suitable mobile computing system, including but not limited to a smartphone, a laptop, a tablet, a smartwatch and smart glasses. In various embodiments, the mobile device 104 includes a user interface (e.g., touch-sensitive display screen, keys, buttons, etc.) and a network interface unit that is connected to a suitable network (e.g., the Internet) so that it can communicate with the cloud service 102.

The mobile device 104 is arranged to transmit event information to the cloud service 104. This event information may be based on any data that is stored on the mobile device (e.g., calendar appointments, user profiles or preferences, a history of transactions involving the device, etc.). Additionally, the event information may involve data derived from a sensor on the mobile device, such as an accelerometer, GPS antenna, motion sensor, gyroscope, etc. Generally, the event information provides insights into both the mobile device and its user (e.g., the location of the mobile device, a flight the user must catch, the time, retailers that the user typically visits, contents of a shopping list, etc.)

The cloud service 102 receives this event information from the mobile device 104. The cloud service 102 then analyzes the event information and the policies received from the vendors to determine whether and which vendor temporary apps should be delivered or made accessible at the mobile device 104.

This determination may be made in a wide variety of ways. In some embodiments, for example, the cloud service 102 determines whether the event information from the mobile device satisfies the temporary app activation policies defined by the vendors. If so, the corresponding temporary app is then delivered to the mobile device from the cloud service and installed.

In still other embodiments, there is additional real time communication regarding the temporary app between a vendor 106a-106c and the cloud service 102. For example, the vendors may have policies that define particular conditions or parameters under which further consultation with the vendor is required or recommended. After receiving the event information and determining that the mobile device is possibly of interest to the vendor, the cloud service may send additional data about the mobile device and/or its user to the vendor. In some implementations, for example, this allows the vendor to more closely examine characteristics of the mobile device user and determine whether any special deals or offerings should be made to the user. The vendor then provides feedback to the cloud service. Based on the feedback, the cloud service then makes a determination as to whether a temporary app is sent. The feedback may also influence the features of the temporary app.

In still other embodiments, the mobile device 104 plays a larger role in determining which temporary apps are made available to it. In some implementations, for example, the cloud service 102 transmits data to the mobile device that refers to multiple temporary apps that could be (but need not be) installed at the mobile device. The mobile device then automatically selects a subset of these temporary apps. The selection process is generally based on an analysis of data in the mobile device. In various embodiments, the mobile device then transmits a request for the selected subset of temporary apps to the cloud service, which responds by providing the requested applications to the mobile device.

For example, a mobile device may receive references to three temporary apps, which are temporary apps for Shops A, B and C, respectively. However, a review of financial data stored in the mobile device indicates that the user has frequently visited Shop A and has never visited Shops B and C. As a result, the mobile device sends a request to the cloud service 102 only for the Shop A temporary app, and not for the other temporary apps. Thus, only the temporary app for Shop A is downloaded into the mobile device from the cloud service 102. This approach reduces the need for the mobile device to send large amounts of event information to the cloud service 102, while at the same time helping to provide temporary apps to the user that are likely to be of interest. In still other embodiments, after the cloud service receives event information (e.g., purchasing history, user profile, location, etc.) from the mobile device indicating that the mobile device user might be interested in offerings from Shops A, B and C, the cloud service transmits data related to this event information to Shops A, B and C. Shops A, B and C can then make special offers to the mobile device user in realtime. For example, Shop A might arrange for the downloading of a temporary app to the mobile device that offers a special discount or other offer that is based on the received event information and tailored to the interests, preferences or current context of the mobile device user.

In many of the embodiments described herein, a mobile device installs a temporary app when the mobile detects an event designated by a vendor. While the event is ongoing, the user can use and interact with the temporary app. Generally, the temporary app is only accessible as long as the event designated by the associated vendor is ongoing. When the mobile device detects that a designated event is no longer ongoing, the installed temporary app may be deleted.

Another approach involves preloading temporary apps at any suitable time (e.g., in the evening when the phone is charging.) Some implementations involve the temporary app being hidden or inaccessible when the mobile device detects that designated event(s) are not occurring. When a designated event does take place, the temporary app is then revealed and/or made accessible to the user. This approach works well for mobile devices that might have connectivity problems and that cannot reliably download temporary apps on the fly.

It should be appreciated that a temporary app may take a wide variety of forms. In some embodiments, the temporary app is any suitable software program or application that is designed to be only temporarily usable at a mobile device, depending on whether a designated event (e.g., location, detection of a particular type of user data, motion, speed, detected proximity to a place, etc.) is detected at the mobile device. Generally, the temporary app is a software program that is intended to be installed on the operating system of a mobile device and provides the executable code necessary to present a user interface and other functionality to the user. Unlike raw data, a temporary app generally does not require another installed app to present information and selectable options to a user, but instead has these functions built into own code. In some embodiments, the temporary app is a web-based app (e.g., uses HTML5.) In this case, the temporary app is generally a relatively lightweight program that is designed to create an accessible pointer on a mobile device to an Internet resource, such as a web page coded in HTML5. When a user issues a command to activate the pointer for the web-based app, the pointer causes the mobile device to access a browser or other program contained in the mobile device that is able to access and render the Internet resource. With web-based temporary apps, most of the core functionality for the application is performed at a server or cloud system.

Figure 2:
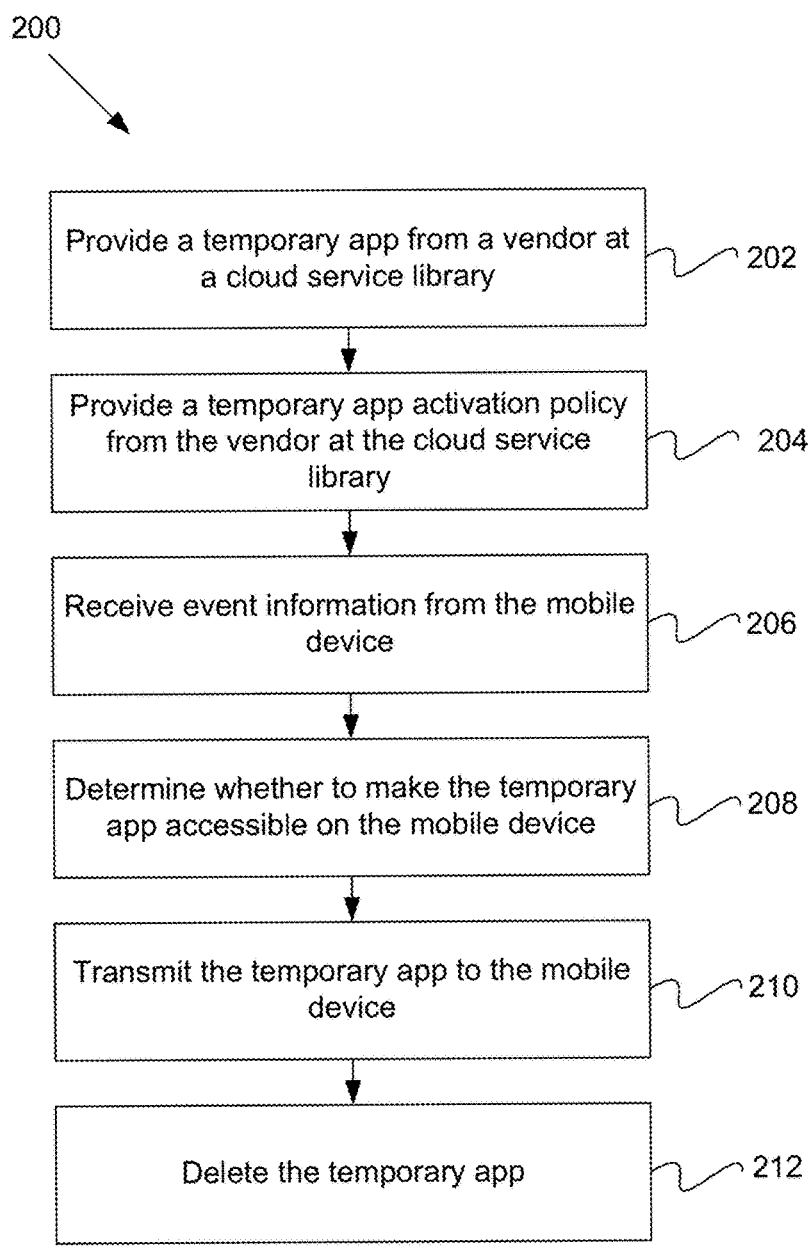
FIG. 2 is a flow diagram of a method for managing temporary apps at a cloud service according to a particular embodiment of the present invention.

Referring next to FIG. 2, a method 200 for managing temporary apps at the cloud service 102 according to a particular embodiment of the present invention will be described. Initially, at step 202, a temporary app is provided from a vendor 106a-106c at a cloud service 102. The vendor may arrange for the transfer of the temporary app to the cloud service 102 in any suitable manner. In some embodiments, for example, each vendor includes one or more servers that are arranged to upload temporary apps to the cloud service 102 over the Internet.

Each temporary app is designed to be available or usable when the mobile device detects a designated event and/or determines that a designated event is still ongoing. If that is not the case, the mobile device may prevent access to the temporary app and/or delete the temporary app, if it has already been installed. For the purposes of this application, the detection of a designated event can be understood to be the detection of any location, condition, parameter, state or characteristic. In some implementations, a designated event involves sensing or detecting something that is external to the mobile device e.g., location, speed, humidity or temperature. In other implementations, a designated event involves detecting a particular type of data, trend or characteristic within the mobile device. For example, a designated event could involve the detection of a particular type of appointment in a calendar that is stored on the mobile device. In various applications, a designated event involves a boolean combination referencing multiple conditions or criteria. For example, a particular temporary app for a shoe store might only be installable and/or accessible at a mobile device when (1) the mobile device detects it is near the shoe store and (2) the mobile devices stores data (e.g., a shopping list) indicating a desire to buy a pair of shoes.

Optionally, at step 204, a temporary app activation policy is provided from the vendor at the cloud service. The temporary app activation policy indicates a designated event that triggers the installation of or allows access to a corresponding temporary app at the mobile device. In various embodiments, for example, the temporary app activation policy indicates event-based conditions or requirements (e.g., the required location of the mobile device, the required data in a user profile, the required sensor data, etc.) that must be satisfied for a particular temporary app to be made available at the mobile device. The temporary app activation policy may be bundled with the associated temporary app and transferred together from the vendor to the cloud service 102, or they may be transferred separately.

The cloud service 102 also receives event information from the mobile device 104 (step 206). The event information is based on the detection of any conditions, characteristics, data or parameters at or around the mobile device. In various embodiments, for example, the mobile device 104 transmits information indicating a history of user actions on the mobile device, a user profile, user preferences, the location, speed or motion of the mobile device. The event information may be based on any data stored in the mobile device or any parameters or characteristics detected using the sensors of the mobile device. Additionally, the event information may be based on data received from another device through a network. For example, a mobile device may be connected to a car through a Bluetooth or other wireless protocol, and can then obtain information relating to the vehicle (e.g., mileage, speed, fuel level, etc.) This information can also be transmitted to the cloud service 102.

At step 208, the cloud service 102 determines whether to make the temporary app accessible on the mobile device 104 based on an analysis of the designated event and the event information received from the mobile device. In some embodiments, the cloud service compares any vendor requirements on the usage of the temporary app (e.g., as indicated in a temporary app activation policy) and the event information received from the mobile device 104. If the event information satisfies the vendor requirements, the temporary app is transmitted to, installed and/or made accessible at the mobile device (step 210).

The above method may be implemented in a wide variety of different ways. In one example, a vendor transfers a temporary app to the cloud service 102 that helps a user of a mobile device 104 find a nearby gas or vehicle repair station. Additionally, the vendor has indicated in a corresponding temporary app activation policy that the temporary app should only be accessible or downloaded at a mobile device 104 if the mobile device 104 does the following: (1) the mobile device 104 is connected via a short-range wireless network (e.g., Bluetooth) to a vehicle and has determined using the network that repair or fueling is necessary; (2) the mobile device 104 is located near or within a predetermined range from gas/repair stations operated by vendors 106a, 106b and 106c.

In another implementation, a vendor 106a-106c transmits a temporary app to the cloud service 102 that helps a person find a particular retail outlet in a shopping mall. The vendor has also indicated in a corresponding temporary app activation policy that the temporary app should be temporarily accessible or downloadable at a mobile device 104 if the mobile device 104 meets the following conditions: (1) the mobile device detects that it is at or near the shopping mall; and (2) the mobile device detects data within the mobile device indicating that the user has shopped at the retail outlet before, is a member of the retail outlet or has a credit card for the retail outlet.

Prior to installing software at the mobile device 104, any suitable identity management and authentication process may be performed between the mobile device 104 and the cloud service 102. The authentication process helps ensure that the download process is valid and that software from a trusted source is being installed at an appropriate mobile device 104.

Once the mobile device 104 has installed a temporary app in response to an event designated by a vendor 106a-106c, the temporary app is generally accessible as long as the mobile device 104 continues to detect the event (e.g., as indicated in the temporary app activation policy.) In various embodiments, when the mobile device 104 detects that a designated event is no longer ongoing, the mobile device 104 may automatically delete the temporary app (step 212). Deletion can be performed in a variety of ways. Some implementations, for example, automatically delete the temporary app in response to a detected event, and no user input is requested or required before the deletion is performed. In other embodiments, user input or confirmation is requested. In some embodiments, the conditions under which a temporary app is deleted may require more than simply the absence of a designated event. For example, a temporary app whose installation was triggered by the movement of a mobile device user into a mall may not be deleted immediately after the user leaves the mall. Instead, the temporary app may be deleted after the mobile device remains outside of the mall for a particular period of time, or based on some other conditions. In some implementations, after the installation of a temporary app, the mobile device is arranged to delete the app automatically once the deletion conditions have been met, without needing to contact the cloud service again. (For example, the mobile device may have received the deletion conditions from the cloud service and can execute them without further input from the cloud service.) In other embodiments, the cloud service 102 directs the mobile device to delete temporary apps.

In still another embodiment, the cloud service 102 provides a preliminary, data-gathering temporary app to a mobile device 104 that helps collect additional event information. This additional event information is then used to help determine whether an additional temporary app should be made accessible at the mobile device 104. For example, consider an example in which a mobile device user is approaching an airport. His or her mobile device 104 sends the mobile device user's location to the cloud service (e.g., step 206). The cloud service 102 responds with a preliminary temporary app that obtains regular updates on the user's flight. The preliminary temporary app is installed at the mobile device and collects data on the progress of the user's flight. This information, in addition to other event information, is sent to the cloud service. Depending on this event information, the cloud service may send another temporary app (e.g., a temporary app that helps the user find another flight or a lounge if his or her flight is delayed.)

Figure 3:
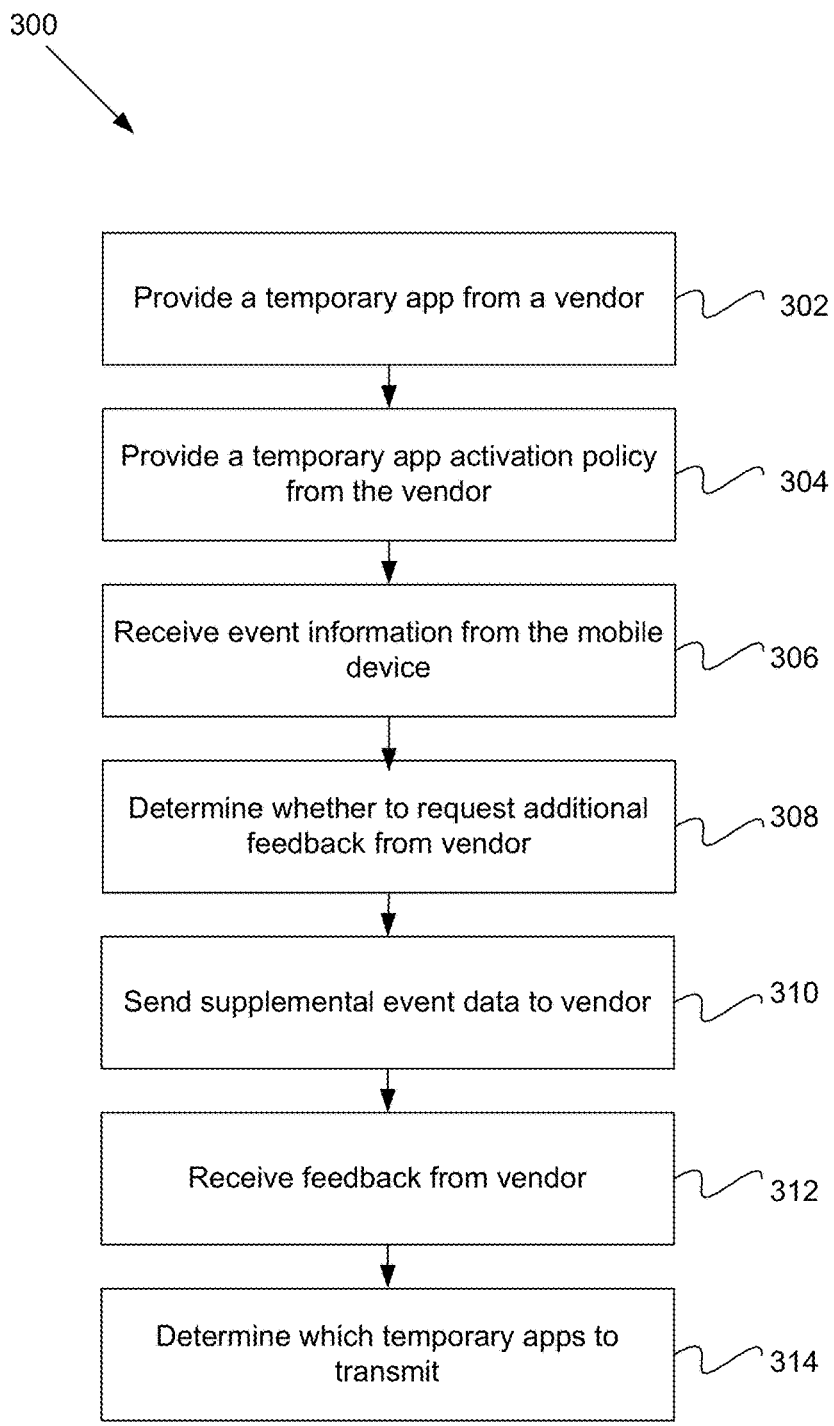
FIG. 3 is a flow diagram of a method for managing temporary apps and receiving feedback from a vendor according to a particular embodiment of the present invention.

Referring next to FIG. 3, a method 300 for managing temporary apps according to another embodiment of the present invention will be described. In this method 300, a vendor is able to provide additional feedback on the temporary apps that are sent to a mobile device. In various embodiments, the operations of method 300 are implemented by software or executable computer code.

As in steps 202, and 206 of FIG. 2, a temporary app from a vendor 106a-106c is provided at the cloud service 102 (step 302) and the cloud service receives event information from the mobile device 104 (step 306.) Similar to step 304 of FIG. 2, a temporary app activation policy is provided from the vendor (step 304). In this example, however, the temporary app activation policy may involve a more complex set of conditions and requirements.

In this method 300, the cloud service 102 may optionally communicate with the vendor 106a-106c if the event information received from the mobile device meets particular vendor requirements. The cloud service determines whether to request additional feedback from the vendor, typically based on the policies set forth by the vendor (step 308). The temporary app activation policy, which indicates the conditions for temporary app access at the mobile device, may involve any suitable number of conditions and requirements. If one particular condition is met, the policy may indicate that the temporary app should be immediately accessible to the mobile device. However, if another condition is met, then the policy may indicate that the cloud service should send certain types of event information to the vendor and await additional feedback from the vendor.

A simple example may be described as follows. Assume that a mobile device user is traveling in a car. Vendors 106a, 106b and 106c are energy companies that have provided three different temporary apps, respectively, to the cloud service. Each temporary app provides at least basic map functionality that can guide a driver to a nearby gas station owned by the respective vendor. Vendor 106a requires (e.g., in a temporary app activation policy) that the cloud service 102 take the following action in response to event information received from a mobile device:

1) IF the mobile device detects that it is within 5 miles of a gas station owned by the vendor, transmit the basic temporary app without any additional functionality to the mobile device.
2) IF the mobile device detects that it is within 10 miles of a gas station owned by the vendor AND IF the mobile device detects that other gas stations are closer to the mobile device, send data regarding the mobile phone user's past financial transactions to the vendor and follow instructions received from vendor.
3) IF the mobile device detects that it is greater than 10 miles away from a gas station owned by the vendor, do not send the temporary app to the mobile device.
4) IF the temporary app has been sent and installed at the mobile device, allow the use of the temporary app until the mobile device detects that the vehicle has been fueled (e.g., using a wireless connection between the mobile device and a vehicle) OR until the mobile device detects that it has not been within 10 minutes of the gas station for at least 5 minutes. Otherwise, delete the temporary app.

Assume that the cloud service 102 receives event information indicating that the mobile device is approximately 9 miles away from a gas station owned by vendor 106a. The event information also indicates that gas stations owned by other vendors are closer (step 306.) Based on the above vendor requirements, the cloud service then makes a determination that further feedback is needed from the vendor (step 308). In accordance with the vendor requirements, the cloud service sends supplemental event data (e.g., the financial transaction data described above) to the vendor (step 310). This supplemental data may be based on event information already received from the mobile device in step 306, or on event information that is separately requested and received from the mobile device.

The vendor 106a is then able to instruct the cloud service 102 to tailor its offering in realtime in response to the received supplemental event data. For example, assume that the supplemental event data indicates that the mobile device user has frequently used gas stations of vendor 106a and has a credit card issued by vendor 106a. Based on this information, the vendor 106a determines that it wants to reward a loyal customer and entice him or her to visit the vendor 106a gas station, even though other gas stations are closer. As a result, the cloud service 102 receives feedback from vendor 106a, indicating that a temporary app should be delivered to the mobile device 104 that, in addition to the base mapping functionality, also offers a special discount as a reward to loyal customers (step 312). The cloud service then transmits the temporary app specified by vendor 106a (step 314.)

In some embodiments, the vendor more directly communicates with the mobile device user and triggers the sending of temporary apps. For example, consider an example in which a mobile device user calls an airline, a taxi service, a consulting service or any other vendor (e.g., using VOIP or a normal phone call.) To assist with the call, the vendor then either directly sends one or more temporary apps to the mobile device from its own servers, or arranges for the cloud service 102 to do the same. Depending on the content of the realtime communication between the mobile device user and the vendor, additional temporary apps may be transmitted to the mobile device. Once the call is over and/or a particular issue or event is resolve, the installed temporary apps may be deleted.

The above techniques allow a vendor to dynamically tailor its temporary apps and offerings to mobile device users based on any event or any data detected by the mobile device. In some embodiments, the vendors store multiple versions of the same temporary app with the cloud service and provide a set of conditions under which each type of temporary app should be deployed and/or made accessible to a mobile device. In other embodiments, the vendors store a base temporary app with the cloud service. The cloud service then configures the base temporary app so that it offers different deals, features and functionality based on feedback received from the vendor, and then delivers the configured temporary app to the mobile device.

Figure 4:
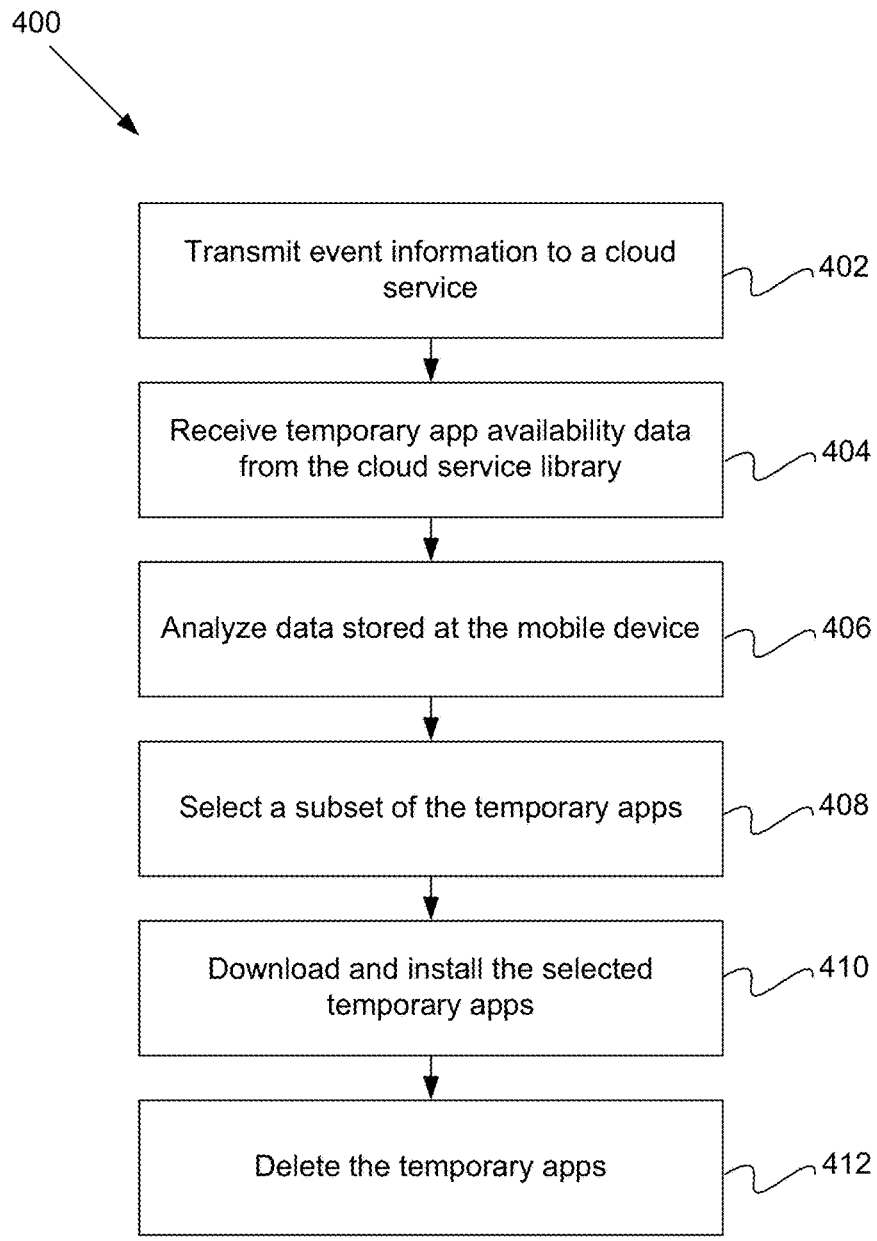
FIG. 4 is a flow diagram of a method for managing temporary apps at a mobile device according to a particular embodiment of the present invention.
Figure 5:
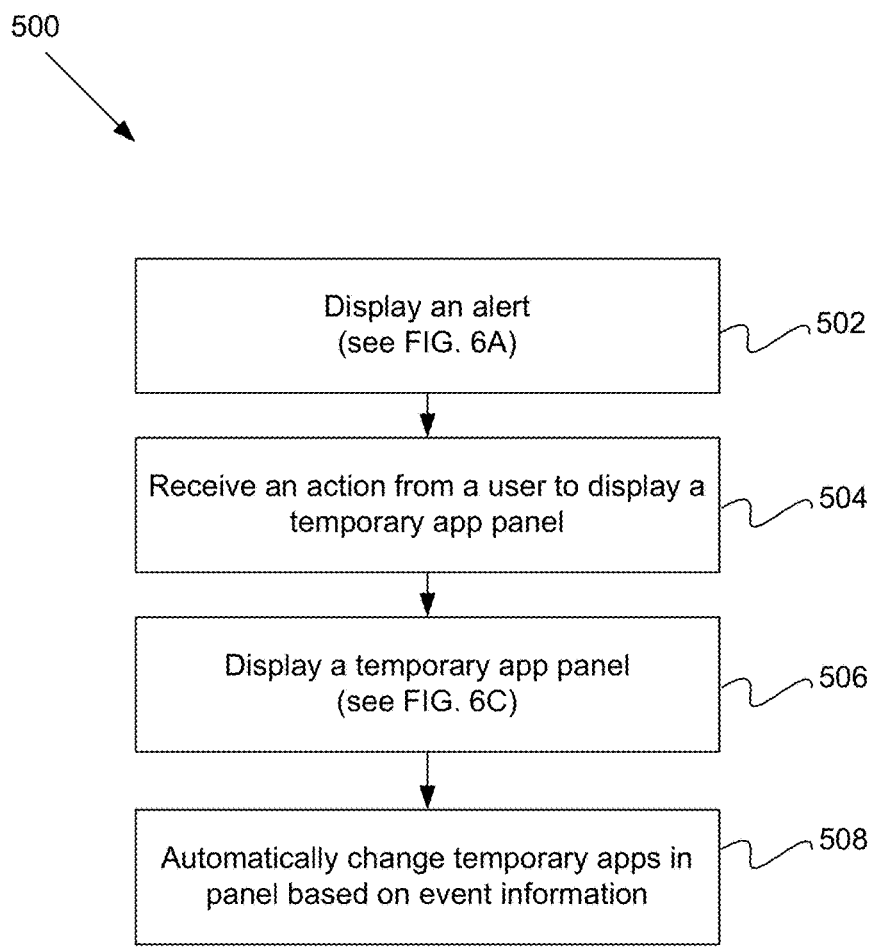
FIG. 5 is a flow diagram of a method for operating a graphic user interface according to a particular embodiment of the present invention.

Referring next to FIG. 4, a method 400 for managing temporary apps at a mobile device according to a particular embodiment of the present invention will be described. In this embodiment, the mobile device 104 uses its sensors and/or stored data to determine which temporary apps to download and/or enable. In various embodiments, the operations of method 400 are implemented by software, executable computer code and/or an application stored on the mobile device 104.

Initially, at step 402, the mobile device 104 transmits event information to the cloud service 102. The event information may involve any sensor data, detected parameters and/or data stored on the mobile device (e.g. as described in connection with FIGS. 2 and 3.)

As previously discussed, the cloud service 102 stores temporary apps and corresponding vendor policies regarding when those temporary apps should be installed or made accessible at a mobile device 104 (e.g., temporary app activation policies.) Based on these vendor requirements, the cloud service 102 generates temporary app availability data. The temporary app availability data refers to a set or list of temporary apps that are being considered for use at the mobile device. For example, the temporary app availability may indicate temporary apps that could (but need not be) installed or made accessible at the mobile device. It should be noted that the temporary app availability data includes references to one or more temporary apps, but does not include the temporary apps themselves.

The cloud service 102 may determine the temporary app availability data in a wide variety of ways. In various embodiments, for example, the temporary app availability data includes a reference to any temporary app whose corresponding temporary app activation policy is satisfied by the event information received from the mobile device. Some temporary apps that satisfy this criteria may be excluded from the temporary app availability data due to a determination that the temporary app is incompatible with the mobile device, possibly due to the type of hardware or software used at the mobile device. Some temporary apps may be excluded based on the event information or other vendor requirements.

The mobile device 104 then receives the temporary app availability data from the cloud service 102 (step 404). The mobile device 104 performs additional analysis to determine which, if any, of the temporary apps referenced in the temporary app availability data should be selected, downloaded and/or used at the mobile device (step 406). This selection process can take into account a variety of parameters. For example, the selection of particular temporary apps may be based on any data detected in the mobile device 104 (e.g., user data, stored calendars, shopping lists or transaction records, history of actions on the mobile device, installed applications, etc.) Additionally, the selection process may be based on any characteristic, parameter or feature detected by a sensor on the mobile device 104 (e.g., location, motion, speed, etc.) In some embodiments, the selection process is based at least in part on user preferences that the user has inputted into the mobile device (e.g., the user may have indicated that he or she has a preference for or does not want certain types of temporary apps, temporary apps from certain types of vendors, etc.) After this analysis, the mobile device 104 then selects a subset of the temporary apps referenced in the temporary app availability data (step 408). The mobile device 104 transmits a request for the selected subset of temporary apps to the cloud service 102. In various embodiments, the selected subset of temporary apps, but not all of the temporary apps referenced in the temporary app availability data, are then made accessible and/or downloaded from the cloud service at the mobile device (step 410). As previously discussed, any installed apps may later be deleted or made inaccessible, depending on the temporary app usage requirements defined by the vendors (step 412).

The above techniques have a variety of applications. One example is described below. Assume that a mobile device 104 user makes a payment using his or her mobile device. The mobile device 104 sends purchase details and other event information to the cloud service provider 102. At the cloud service provider 102, there are many temporary apps provided by various vendors that are meant to be triggered by a payment event at a mobile device 104. For example, some temporary apps process credit card or other financial transactions for different companies (e.g., Visa, Mastercard, Paypal, etc.) Other temporary apps are designed to provide deals at the time that a mobile device user is considering a purchase (e.g., Groupon, LivingSocial, etc.) The cloud service provider sends temporary app availability data in response, which references several of these temporary apps. In this example, the temporary app availability data references temporary apps A, B and C, which process purchases using credit cards A, B and C.

The mobile device then analyzes financial data stored at the mobile device to determine which of the referenced temporary apps should be actually used or downloaded. For example, the financial data may be from a finance application installed at the mobile device, or from other processes running in the mobile device that track the user's financial transactions. In various embodiments, of course, such financial data could be transmitted to the cloud service 102, so that the cloud service 102 could select suitable temporary apps and sent them back to the mobile device 104. However, for privacy and security reasons it may be desirable to limit the transfer of personal financial data over the Internet.

The above technique allows the financial data to remain on the mobile device 104 and allows the mobile device 104 itself to determine based on the financial data or any other event information, which of the suggested temporary apps to access or download. In this example, the mobile device 104 analyzes financial data or financial software stored on the mobile device 104, and determines that the mobile device user frequently uses credit card A, but not credit cards B and C. As a result, the mobile device transmits a request to the cloud service for only temporary app A. In this example, the temporary app A is then downloaded from the cloud service and/or accessed at the mobile device.

Figure 6A:
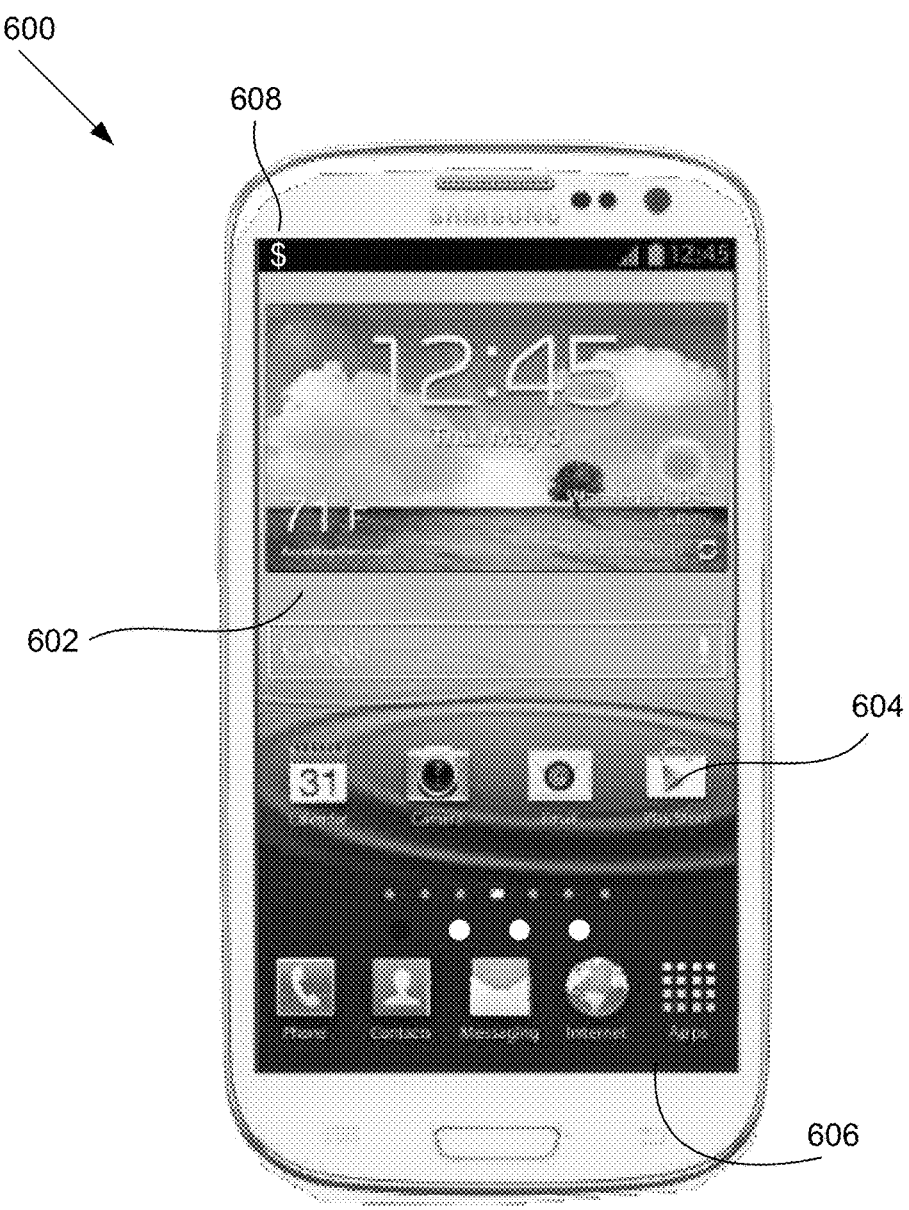
FIGS. 6A-6C are example illustrations of a mobile device and a graphical user interface.
Figure 6B:
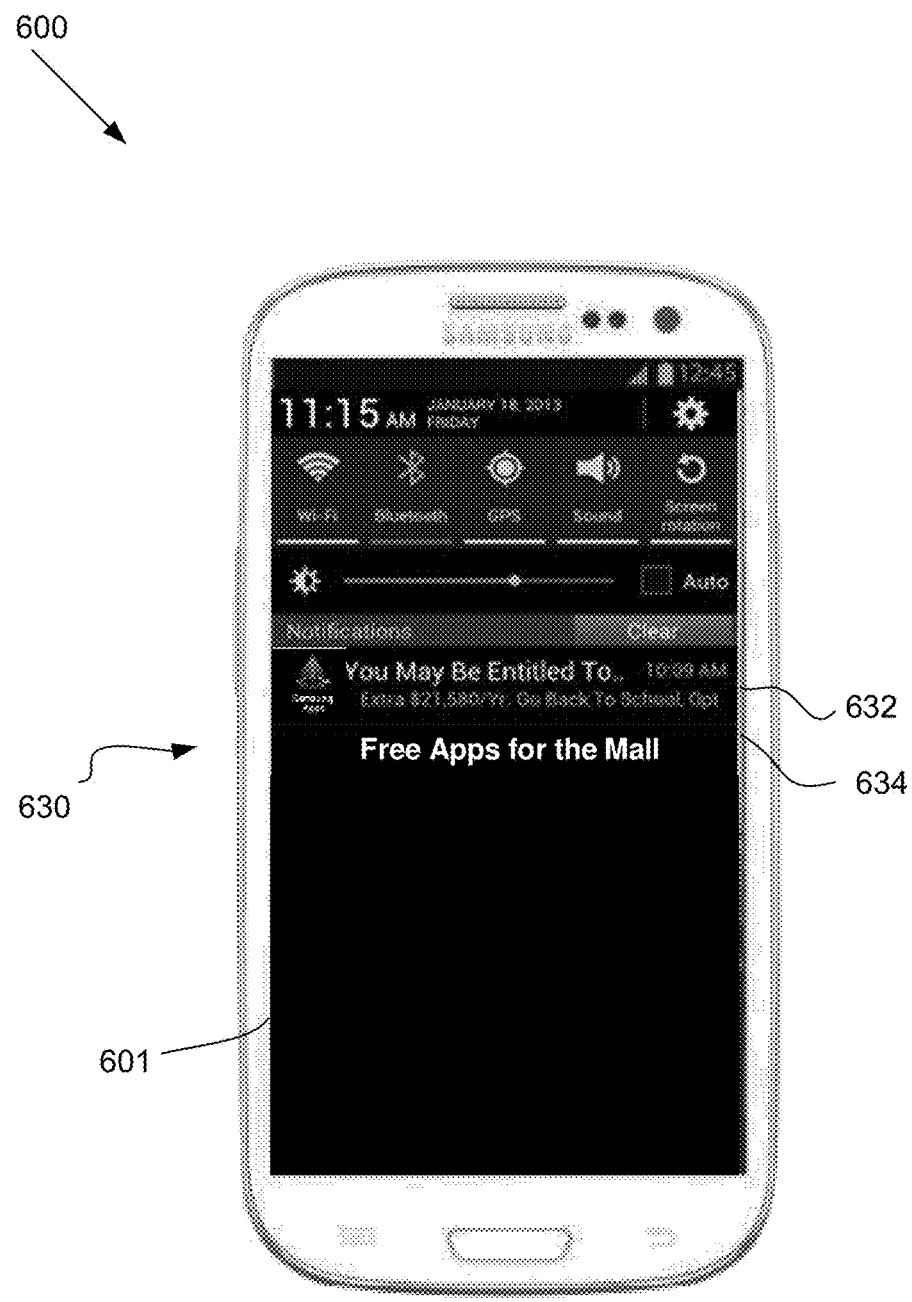
Figure 6C:
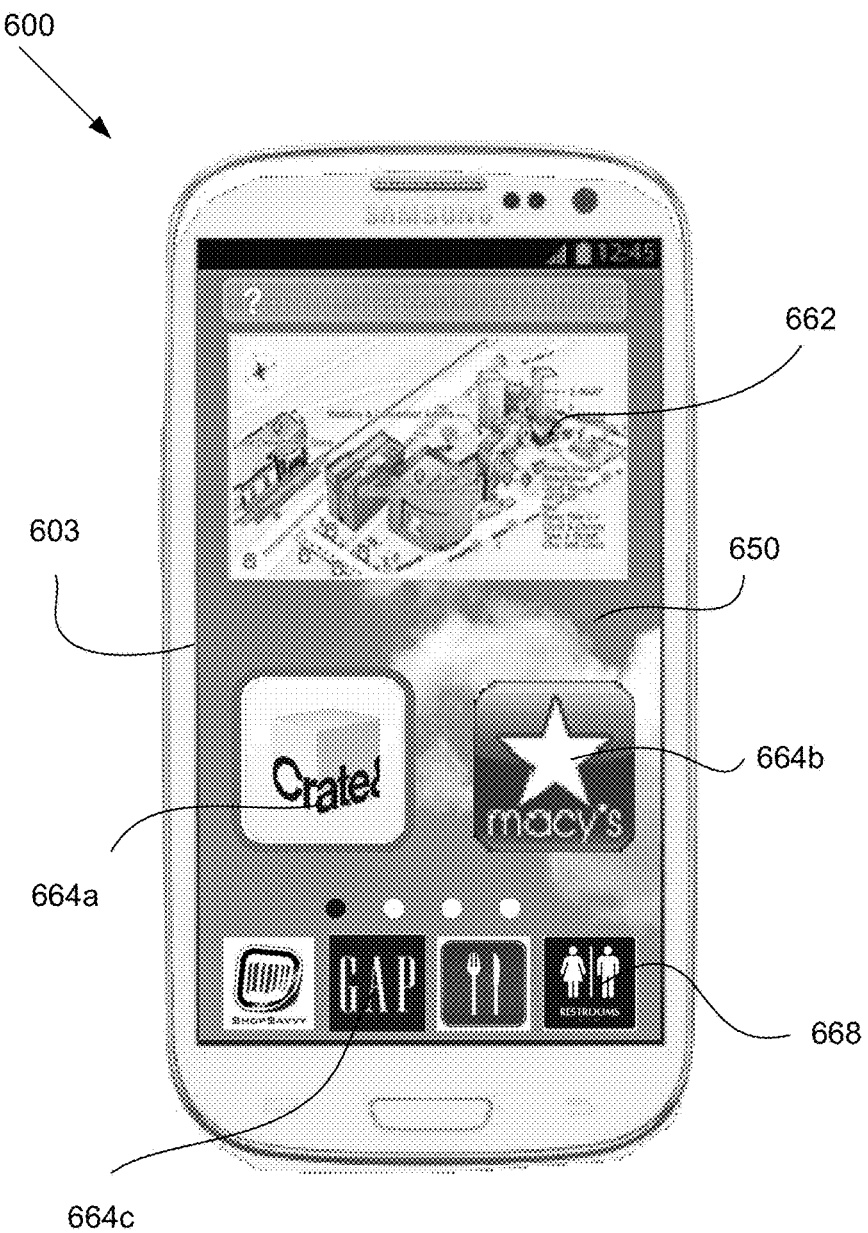

Referring next to FIGS. 5 and 6A-6C, a method 500 for interacting with a user interface (UI) at a mobile device 104 according to a particular embodiment of the present invention will be described. More specifically, the method 500 describes how an example UI can be used to organize, display and/or use temporary apps at the mobile device 600. FIGS. 6A-6C illustrate an example mobile device 600 whose user interface changes as the steps of method 500 are performed.

In the example illustrated in FIG. 6A, the mobile device 600 is a smartphone with a touch-sensitive (e.g., capacitive) video display screen 606, although any suitable mobile device or display technology may be used. The mobile device 600 includes at least some or all of the features of mobile device 104 of FIG. 1 and is arranged to perform any of the mobile device operations described herein. The video display screen 606 provides a graphical user interface 602. The graphical user interface (GUI) 602 illustrated in FIG. 6A displays a home page that has application icons 604 arranged in a grid array. Each icon represents a mobile application that is executable on the mobile device 600. A user can see additional pages by providing input to the interface (e.g., by applying a finger to an edge of the display screen and sweeping it across the screen.) Any known operating system and user interface may be used in the mobile device 604 (e.g., Android, iOS, Windows Phone, etc.) None of the illustrated applications are temporary apps, but instead are standard mobile applications that were either preinstalled on the device or downloaded from an online store.

Initially, at step 502, an alert notice is displayed at a mobile device 600. The alert indicates that temporary apps are available (e.g., after they have been received from the cloud service 102 of FIG. 1, as described in connection with step 210 of FIG. 2 and step 410 of FIG. 4.) This alert may be displayed in any suitable manner. For example, a panel may appear on the screen, with words indicating that temporary apps are available. Alternatively or additionally, a sound may be generated at a speaker of the mobile device. In the illustrated embodiment, an alert icon 608 in the shape of a dollar sign ("$") appears in a notification bar at the top of the GUI. Generally, the alert notice can be displayed or generated using any known technique for providing alerts in any known mobile operating system.

To see further details about the alert, additional action may be required from the user. In the illustrated embodiments of FIGS. 6A and 6B, for example, the mobile device receives an action or request from a user to view a list of ongoing notifications 630. In some designs, this action involves sweeping a finger from the top edge region of the screen downward towards the bottom edge region. Other actions (e.g., sweeping a finger at other locations on the screen, activation of another button or feature on the screen, an audio command, etc.) may also be used. The action reveals the user interface 601 of FIG. 6B. The user interface 601 displays the list of notifications 630. The list of notifications 630 includes a message 632 indicating a particular deal or feature that one installed temporary app offers. In some embodiments, the message 632 can be physically pressed or otherwise activated to directly launch the associated temporary app. Another item 634 on the list indicates more generally that multiple temporary apps are available. It may also indicate what conditions or parameters led to the availability of these temporary apps (e.g., proximity to a mall, a payment transaction, a particular time or event, etc.) In the illustrated embodiment, item 634 indicates that several temporary apps are available that would be helpful for a visit to a shopping mall.

In various embodiments, any alert for a particular temporary app automatically appears or disappears from the notification bar, notification list or any other location on a UI, depending on whether a particular event designated for the temporary app is ongoing or not. That is, the display of an alert occurs when it is determined that the designated event is ongoing, when it is determined that the temporary app should be made accessible to the mobile device (e.g., step 208 of FIG. 2) and/or when the temporary app is installed at the mobile device (e.g., step 210 of FIG. 2). An existing alert may automatically disappear when it is determined that a designated event is no longer ongoing and/or when the corresponding temporary app is deleted (e.g., step 212 of FIG. 2). Generally, the appearance or disappearance of alerts is triggered by the detection of events, and does not necessarily require user input or confirmation.

Returning to FIG. 5, at step 504, the user interface 601 then receives an action from a user, indicating a request to display the available temporary apps. A variety of actions may be used. In some embodiments, for example, the user presses the item 602 on the notification list to display the temporary apps referred to therein. Alternatively, the user may provide another type of input to the mobile device (e.g., a finger sweep, audio command, activation or physical touching of another button on or portion of the screen, etc.)

In response to the received action, the mobile device 600 displays a temporary app panel 650 (step 506) on its user interface 603. The temporary app panel 650 is any suitable interface design or structure for presenting temporary apps to a user. One example design is illustrated in FIG. 6C. FIG. 6C illustrates a user interface 603 with various temporary app indicators 662, 664a, 664b, 664c, 664d and 668. Each temporary app indicator represents a particular temporary app. In this example, each temporary app indicator includes a different graphical image and possibly some text that helps identify the temporary app and/or its relationship to a particular vendor or service.

Each of these temporary app indicators represents a temporary app that has been installed and downloaded using any of the methods described in this application. That is, the appearance of the temporary app indicators means that the vendor requirements (e.g., as represented in the associated temporary app activation policies) for the corresponding temporary apps have been met by the mobile device.

In the illustrated embodiment, since a touch-sensitive screen is being used, a user can activate or launch a temporary app by touching the corresponding temporary app indicator on the screen. Any other suitable technique for activating an application (e.g., audio commands, other touch motions, etc.) may also be used. Some embodiments allow a user to access additional pages of temporary apps by brushing a finger across the screen.

Some implementations contemplate an automatic arrangement of temporary app indicators in a single temporary app panel where all the displayed temporary app indicators are arranged to help a user deal with the same event and/or were installed in response to the detection of the same event. In some situations, a user will want easy, quick access to a variety of temporary apps that cover many of his or her basic needs for particular situations. Accordingly, the temporary app panel may select different temporary apps by category and type and arrange them in a single panel or page so that they are all viewable at once. One example is shown in FIG. 6C. The displayed temporary app panel 650 only includes temporary apps that are useful for visiting a particular mall and/or that were all downloaded to the mobile device in response to the movement of the mobile device into the mall. Other temporary apps that are not relevant for or related to the mall are excluded. The page includes temporary app indicators for a variety of types of temporary apps. For example, temporary app indicator 662 involves a temporary app that provides a map of the mall. Temporary app indicator 664a-664c involves temporary apps for retail outlets in the mall. Temporary app indicator 668 provides direction to an important location in the mall (e.g., the bathrooms at the mall.) In some embodiments, the cloud service 102 determines the arrangement of temporary app indicators on the temporary app display panel 650, based on vendor requirements, the temporary app activation policies, and/or event information received from the mobile device 600 (e.g., event information indicating that the mobile device 600 is currently at the mall.)

It should be noted that in conventional mobile devices running, for example, the iOS or Android operating systems, applications are typically downloaded one by one and the application icons are displayed in the order in which they were downloaded. Typically the task of arranging application icons into groups or pages based on subject matter falls to the user. By contrast, in various embodiments of the present invention, temporary app indicators may be displayed in a particular, automatically designed configuration (e.g., as seen in FIG. 6C), in response to a vendor designated event detected by the mobile device, where only temporary apps related to a designated event are included in the displayed configuration and/or unrelated temporary apps are not visible in the temporary app panel (or possibly anywhere in the screen of the mobile device.) Generally, in such implementations, the mobile device user provides no direct input in how the temporary app indicators are arranged on the temporary app panel, aside from actions that affect the event information sent from the mobile device.

Some implementations allow a user to easily access the temporary app panel at almost any time with a single gesture. In various embodiments, for example, the user can navigate from other pages of the graphic user interface (e.g., the home screen illustrated in FIG. 6A) immediately to the temporary app panel (e.g., as seen in FIG. 6C) by issuing an audio command, tracing a figure on the screen with a finger, making a sweeping motion or a multitouch motion on the screen, activating a button, or any other suitable action. Thus, in various embodiments, the user can repeatedly display and dismiss the temporary app panel over time.

In some implementations, the mobile device will prevent a user from accessing the temporary app panel when no temporary apps are installed and/or the mobile device is detecting an event that does not satisfy any requirements of any known temporary app activation policies stored at the cloud service. Alternatively, the user may be allowed to access the temporary app panel in that instance, but will not see any temporary app indicators on the panel, and possibly will see a message indicating that no temporary apps are available.

Some designs contemplate a temporary app panel that changes dynamically, depending on what events the mobile device is currently detecting (step 508). That is, as the mobile device moves into different contexts and/or detects different events, different temporary apps may be deleted while others are installed or enabled (e.g., as discussed in connection with FIGS. 1-5). Accordingly, the temporary app indicators associated with these temporary apps may automatically appear and disappear from the temporary app panel 650, possibly without requiring any confirmation or command from a user.

Figure 7:
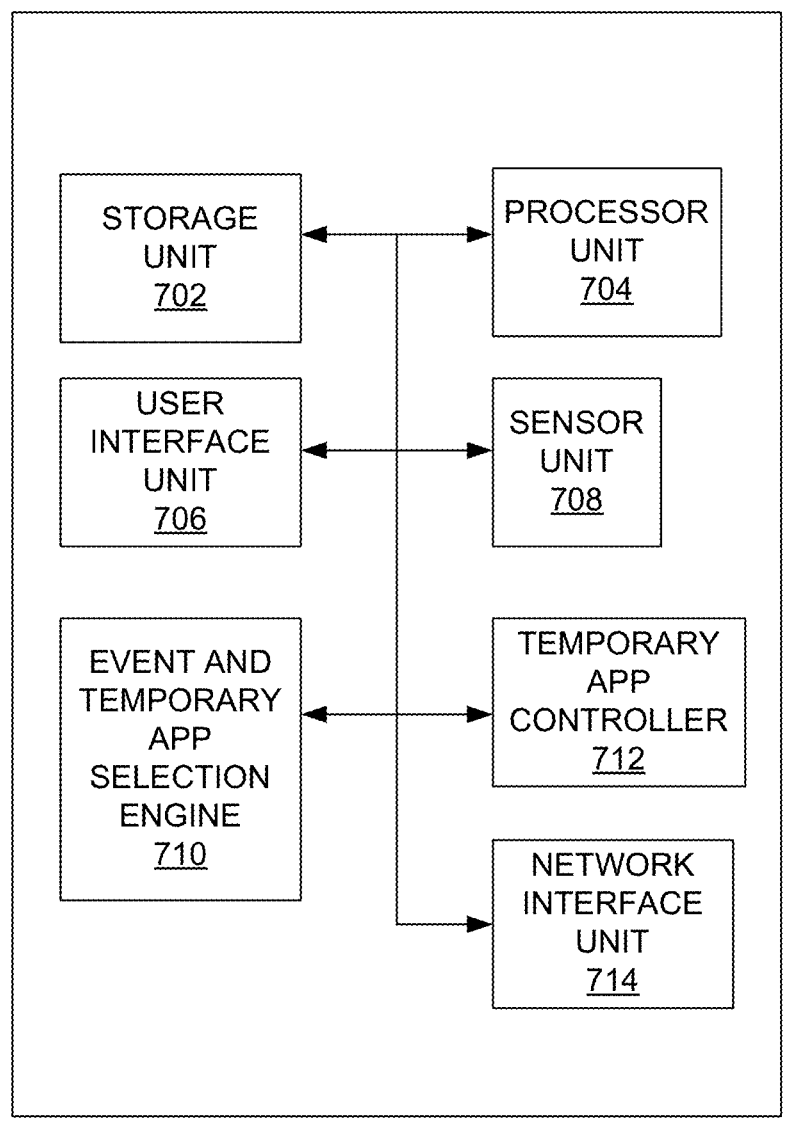
FIG. 7 is a server of a cloud service according to a particular embodiment of the present invention.

Referring next to FIG. 7, a mobile device 700 according to a particular embodiment of the present invention will be described. In various embodiments, the mobile device 700 is the mobile device 104 of FIG. 1 and/or the mobile device 600 of FIG. 6. The mobile device 700 includes a storage unit 702, a processor unit 704, a sensor unit 708, a user interface unit 706, a temporary app controller 712, a network interface unit 714 and an event and temporary app selection engine 710.

The storage unit 702 is any mechanism or device suitable for storing data. For example, the storage unit may include volatile memory, non-volatile memory, flash memory, a hard drive and/or any suitable computer readable storage medium. In various embodiments, the storage unit 702 stores computer readable code that can be read and executed by the processor unit 704.

The processor unit 704 includes one or more processors. The processor unit 704 is arranged to execute the computer executable code stored in the storage unit 702. The execution of the code can cause the mobile device 700 to perform any of the operations described in this application for a mobile device. For example, when executed, the code in the storage unit may cause the mobile device 700 to perform any of the steps described in method 400 of FIG. 4 and/or method 500 of FIG. 5.

The sensor unit 708 includes one or more sensors or detection devices. The sensor unit 708 may include a wide variety of different sensors, including a GPS antenna, a digital compass, a gyroscope, an accelerometer, a light sensor, a proximity sensor and sensors for detecting physical characteristics of the ambient environment, such as temperature and humidity. The sensors are arranged to generate various types of sensor data, including but not limited to location data, directional data, orientation data, motion data, light detection data and temperature/humidity data. Any and all of the information gathered through the sensors can be transmitted to a cloud service 102 through the network interface unit 706 (e.g., as discussed in connection with step 206 of FIG. 2 and step 402 of FIG. 4).

The network interface unit 706 is one or more devices, antennae or other mechanisms that are arranged to connect the mobile device 700 to external networks. In various embodiments, the network interface unit 706 is arranged to connect to any suitable wireless, wired and/or cellular network (e.g., Bluetooth, Wi-Fi, GSM, CDMA, etc.) The mobile device 700 is arranged to transmit data, for example, to the cloud service 102 through the network interface unit 706. In some embodiments, the mobile device receives downloads and instructions from the cloud service 102 through the network interface unit 706 as well.

The user interface unit 706 is any software and/or hardware used to help a user interact with the mobile device. Any suitable interface technologies may be used. In some embodiments, for example, the interface unit includes a computer display screen, a capacitive screen, an e-ink display, a microphone that is arranged to receive audio commands, a keyboard, one or more switches or buttons, etc. In various embodiments, the user interface unit 706 is arranged to display any user interface described in connection with FIGS. 5 and 6A-6C.

The temporary app controller 712 is any software or hardware that is arranged to help manage the use of temporary apps on the mobile device 700. In some designs, the temporary app controller 712 is a software application that is installed on the mobile device 700. The temporary app controller 712 may perform a wide variety of functions, including the retrieval and processing of temporary apps and other data from the cloud service 102 and the collecting and transmission of event information from the mobile device 700 to the cloud service 102. Generally, the temporary app controller 712 is arranged to help the mobile device perform any mobile device operation described in this application.

The optional event and temporary app selection engine 710 is used in some of the embodiments described in connection with FIG. 4. In various embodiments, the mobile device 700 receives temporary app availability data e.g., data that references a set of temporary apps that might, but need not be, installed at the mobile device 700. The engine is arranged to help select a subset of these temporary apps for activation or installation at the mobile device. In various embodiments, the engine 710 is arranged to analyze sensor and stored data to help determine the selected subset. Any operation described in connection with steps 404, 406, 408 and 410 of FIG. 4 may be performed by the engine 710.

Figure 8:
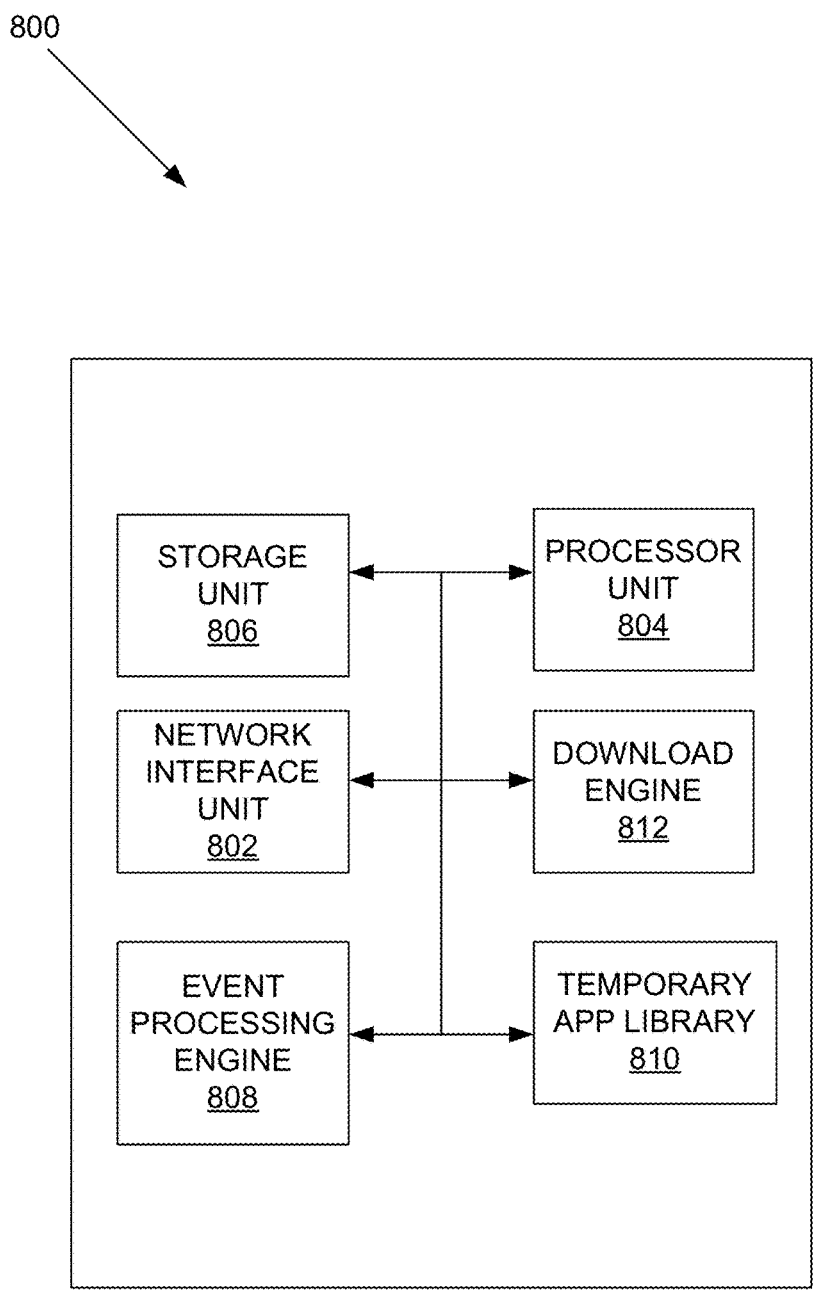
FIG. 8 is a mobile device according to a particular embodiment of the present invention.

Referring next to FIG. 8, a server 800 of a cloud service 102 according to a particular embodiment of the present invention will be described. FIG. 8 may also represent a network of more than one server. The server 800 includes a network interface unit 802, a processor unit 804, a storage unit 806, an event processing engine 808, a temporary app library 810 and a download engine 812.

The storage unit 806 is any mechanism or device suitable for storing data. For example, the storage unit may include volatile memory, non-volatile memory, flash memory, a hard drive and/or any suitable computer readable storage medium. In various embodiments, the storage unit stores computer readable code that can be read and executed by the processor unit 804.

The processor unit 804 includes one or more processors. The processor unit is arranged to execute the computer executable code stored in the storage unit 806. The execution of the code can cause the server 800 to perform any of the operations described in this application for the cloud service 102. For example, when executed, the code in the storage unit 806 may cause the server 800 to perform any of the steps described in method 200 of FIG. 2 and method 300 of FIG. 3.

The network interface unit 802 is any hardware or software arranged to help connect the server 800 to a network. In various embodiments, the network interface unit 800 helps connect the server 800 to any suitable wired or wireless networks (e.g., the Internet.) The server 800 is arranged to transmit data (e.g., temporary apps, temporary app availability data, instructions, etc.) to a mobile device (e.g., mobile device 104 of FIG. 1 or mobile device 700 of FIG. 7) through the network interface unit 802. In some embodiments, the server 800 also receives event information and other data from the mobile device through the network interface unit 802. In various embodiments, the network interface unit 802 facilitates communication with a variety of external entities and devices, including mobile devices and vendors.

The temporary app library 810 is any hardware or software arranged to store temporary apps, which are generally received from vendors, companies or other entities. In some embodiments, the vendor requirements for the use or installation of a temporary app at a mobile device (e.g., temporary app activation policies) are also stored here.

The event processing engine 808 is any hardware or software arranged to analyze event information received through the network interface unit 802 from a mobile device. The engine 808 also analyzes the vendor requirements for the usage or installation of temporary apps stored in the temporary app library. In various embodiments, if it is determined that the event information received from a particular mobile device satisfies the vendor requirements for a particular temporary app, the event processing engine will transmit a signal to the download engine 812 to transmit the temporary app to the mobile device. For example, any operations described in connection with steps 206 and 208 of FIG. 2 may be performed by the event processing engine 808.

The download engine 812 receives input from the event processing engine 808 and arranges for the transmission of a designated temporary app to a designated mobile device. The download engine 812 may be any software or hardware (e.g., a software module) suitable for managing the transmission of temporary apps to mobile devices. For example, any operations described in connection with step 210 of FIG. 2 may be performed by the download engine.

In the above application, there are several references to the download of a temporary app from the cloud service to a mobile device in response to a designated event. Once the mobile device detects that a designated event is no longer ongoing, the temporary app is automatically deleted. It should be appreciated that any such described embodiment may also be modified to instead use preloaded temporary apps. That is, a temporary app is preloaded, possibly at a time in which a designated event still has not taken place. In some embodiments, for example, a temporary app is preloaded in the evening or some other time selected by a user of the mobile device. However, the temporary apps are hidden and/or are not accessible to a user until the mobile device detects a designated event. When the mobile device detects a designated event, the temporary apps are revealed and/or made accessible (i.e., can be run or used by the mobile device and/or a user). Accordingly, in response to the detection of different events, the temporary app may appear and disappear from the temporary app panel 650 described in connection with FIG. 6C.

In some embodiments, a temporary app is downloaded to a mobile device when the mobile device detects a designated event and/or is deleted when the mobile device detects that designated event(s) are no longer occurring. In various implementations, such downloading and deletion occurs automatically e.g., without requiring any input or confirmation from the mobile device user. In other implementations, the user is prompted to confirm the download or deletion (e.g., by providing a command or input to the mobile device, by providing a reply to a query from the mobile device, etc.) In still other embodiments, the user may set preferences at their mobile device indicating whether a prompt is required or not. In various approaches, the user may terminate the designated event (e.g., provide input to the mobile device that causes the mobile device to determine that the designated event is no longer occurring) and thus cause the deletion of the temporary app.

Although only a few embodiments of the invention have been described in detail, it should be appreciated that the invention may be implemented in many other forms without departing from the spirit or scope of the invention. For example, the figures include block diagrams. Each block diagram refers to a variety of different components. It should be appreciated that the features and functionality of one component may be transferred to another and the number of components and their arrangement may be different from what is shown in the figures. Any component can be divided into multiple components, or two or more components may be combined. Additionally, the figures for the application illustrate methods with various steps. These steps may be modified or reordered. In some embodiments, particular steps are removed or new steps are added as appropriate. Therefore, the present embodiments should be considered illustrative and not restrictive and the invention is not to be limited to the details given herein.

The invention claimed is:

1. A method for managing mobile applications for a mobile device using a cloud service, the method comprising:
providing, at a cloud service, a temporary app from a vendor, the temporary app being a mobile application that is temporarily accessible on a mobile device when a designated event is detected by the mobile device;
receiving, at the cloud service, event information from the mobile device, the event information indicating a current event detected by the mobile device;
determining, at the cloud service, whether to make the temporary app accessible on the mobile device based on an analysis of the designated event and the event information received from the mobile device;
causing automatic download and installation of the temporary app on the mobile device prior to the designated event;
causing hiding the downloaded temporary app when the designated event is not ongoing, thereby helping to prevent a user from accessing the temporary app; and
causing revealing the downloaded temporary app to the user when the designated event is detected by the mobile device, thereby allowing access to the temporary app while the designated event is ongoing.

2. The method of claim 1 wherein the designated event detected by the mobile device involves at least one selected from the group consisting of: (1) the mobile device detecting that the mobile device is in a particular location, (2) the mobile device detecting a particular time range; (3) the mobile device detecting that a certain type of user data is stored on the mobile device; (4) the mobile device detecting a particular physical characteristic in an environment around the mobile device; (5) the mobile device detecting a particular speed at which the mobile device is traveling; (6) the mobile device detecting a particular update from an information provider; (7) the mobile device detecting a particular shopping preference; (8) the mobile device detecting a particular vendor preference; (9) contextual information; (10) user preferences; and (11) sensor data obtained by the mobile device.

3. A method for managing mobile applications for a mobile device using a cloud service, the method comprising:
providing, at the cloud service, an automatic download and installation of a temporary app to the mobile device prior to a designated event being detected by the mobile device; causing, by the cloud service, the temporary app to be inaccessible on the mobile device when the designated event is not ongoing; causing, by the cloud service, the temporary app, being a mobile application, to be temporarily accessible on the mobile device when the designated event is detected by the mobile device; receiving, at the cloud service, event information from the mobile device, the event information indicating a current event detected by the mobile device; determining, at the cloud service, whether to install a preliminary, data-gathering temporary app at the mobile device based on the event information; transmitting the preliminary, data-gathering temporary app to the mobile device so that the preliminary, data-gathering temporary app can be installed at the mobile device; receiving, at the cloud service, additional data associated with but not the same as the event information obtained using the preliminary, data-gathering temporary app; and determining, at the cloud service, whether to make the temporary app accessible on the mobile device based on an analysis of the designated event, the event information and the additional data received from the data-gathering temporary app on the mobile device.

4. The method of claim 1, the method further comprising:
providing, at the cloud service, a plurality of temporary apps from one or more vendors wherein each temporary app is a mobile application that is temporarily accessible on the mobile device when a designated event is detected by the mobile device;
providing, at the cloud service, a plurality of temporary app activation policies that are associated with the plurality of temporary apps, respectively, wherein each temporary app activation policy indicates a designated event required for use of the associated temporary app;
analyzing, at the cloud service, the plurality of temporary app activation policies;
determining, based on the analysis of the temporary app activation policies and the event information received from the mobile device, that a subset of the plurality of temporary apps could be usable on the mobile device; and
transmitting, from the cloud service, temporary app availability data to the mobile device in response to a request received from the mobile device, the temporary app availability data indicating the subset of the plurality of temporary apps that could be usable on the mobile device.

5. The method of claim 4, the method comprising:
receiving, at the cloud service, a request from the mobile device, the request for at least one of the subset of temporary apps; and
transmitting, from the cloud service, the requested temporary apps to the mobile device so that the requested temporary apps may be installed on the mobile device.

6. The method of claim 1, the method comprising:
transmitting, from the cloud service, supplemental event data to the vendor, the supplemental event data being based on the event information received from the mobile device;
receiving, at the cloud service, vendor feedback in response to the supplemental event data;
determining, at the cloud service, which temporary apps to transmit to the mobile device based on the vendor feedback.

7. The method of claim 1 wherein the temporary app is at least one selected from the group consisting of a web-based application and an HTML5 application.

8. The method of claim 3, the method further comprising:
providing, at the cloud service, a temporary app activation policy from the vendor, the temporary app activation policy indicating the designated event required for use of the temporary app;
determining, at the cloud service, whether the event information received from the mobile device satisfies the temporary app activation policy; and
if the received event information satisfies the temporary app activation policy, transmitting the temporary app to the mobile device in response to a request from the mobile device so that the user can access the mobile app.

9. A nontransitory computer readable storage medium that includes executable computer instructions embodied in a nontransitory form operable to automatically select a subset of available temporary apps and temporarily allow access to the subset of temporary apps when a designated event is detected wherein the computer readable storage medium includes:

instructions operable to transmit event information to a cloud service, the event information indicating that the mobile device has detected a designated event;

instructions operable to receive temporary app availability data from the cloud service, the temporary app availability data indicating a plurality of temporary apps, each temporary app being a mobile application that is arranged to be temporarily accessible on the mobile device when the designated event is detected by the mobile device;

instructions operable to analyze data stored at the mobile device; and instructions operable to select, based on the data analysis, a subset of the plurality of temporary apps that should be made accessible to a user of the mobile device;

instructions operable to automatically download and install at least one temporary app of the subset of the plurality of temporary apps on the mobile device prior to the designated event;

instructions operable to hide the downloaded at least one temporary app when the designated event is not ongoing, thereby helping to prevent a user from accessing the temporary app; and instructions operable to reveal the downloaded at least one temporary app to the user when the designated event is detected by the mobile device, thereby allowing access to the at least one temporary app while the designated event is ongoing.

10. The nontransitory computer readable storage medium of claim 9, further including:

instructions operable to transmit a request to the cloud service for the subset of temporary apps selected by the mobile device; and instructions operable to download the subset of temporary apps from the cloud service and install the subset of temporary apps at the mobile device.

11. The nontransitory computer readable storage medium of claim 10, further including:

instructions operable to delete the installed subset of temporary apps from the mobile device under a condition selected from the group consisting of: (1) when the mobile device determines that the designated event is no longer occurring; and (2) when the mobile device determines that the user has terminated the designated event.

12. The nontransitory computer readable storage medium of claim 9 wherein the user data involves at least one selected from the group consisting of: (1) calendar data stored on the mobile device; (2) a shopping list stored on the mobile device; (3) a stored history of user actions on the mobile device; (4) a stored history of financial transactions made by the user of the mobile device; (5) a user profile stored on the mobile device; and (6) user preferences stored on the mobile device.

13. The nontransitory computer readable storage medium of claim 9 wherein the designated event detected by the mobile device involves at least one selected from the group consisting of: (1) the mobile device detecting that the mobile device is in a particular location, (2) the mobile device detecting a particular time, (3) the mobile device detecting that a certain type of user data is stored on the mobile device; (4) the mobile device detecting a particular physical characteristic in an environment around the mobile device; (5) the mobile device detecting a particular speed at which the mobile device is traveling; (6) the mobile device detecting a particular update from an information provider; (7) the mobile device detecting a particular shopping preference; (8) the mobile device detecting a particular vendor preference; (9) contextual information; (10) user preferences; and (11) sensor data obtained by the mobile device.

14. A mobile device comprising:

at least one storage unit, the storage unit including a nontransitory computer readable medium that includes executable computer instructions embodied in a non-transitory form operable to automatically select a subset of available temporary apps and temporarily allow access to the subset of temporary apps when a designated event is detected wherein the computer readable storage medium includes:

instructions operable to transmit event information to a cloud service, the event information indicating that the mobile device has detected the designated event;

instructions operable to receive temporary app availability data from the cloud service, the temporary app availability data indicating a plurality of temporary apps, each temporary app being a mobile application that is arranged to be temporarily accessible on the mobile device when the designated event is detected by the mobile device;

instructions operable to analyze data stored at the mobile device;

instructions operable to select, based on the data analysis, a subset of the plurality of temporary apps that should be made accessible to a user of the mobile device;

instructions operable to automatically download and install at least one temporary app of the subset of the plurality of temporary apps on the mobile device prior to the designated event;

instructions operable to hide the downloaded at least one temporary app when the designated event is not ongoing, thereby helping to prevent a user from accessing the temporary app; and instructions operable to reveal the downloaded at least one temporary app to the user when the designated event is detected by the mobile device, thereby allowing access to the at least one temporary app while the designated event is ongoing; and at least one processor that is arranged to execute the computer instructions in the computer readable medium.

15. A non-transitory computer readable storage medium that includes executable computer instructions embodied in a non-transitory form operable to provide a user interface for accessing one or more temporary apps wherein the computer readable medium includes: instructions operable to automatically download and install a temporary app to a mobile device prior to a designated event being detected by the mobile device; instructions operable to hide the temporary app when the designated event is not ongoing, thereby helping prevent a user from accessing the temporary app; instructions operable to display an alert on a graphical user interface (GUI) indicating that the designated event has occurred and that the temporary app related to the designated event is available, the temporary app being a mobile application that is arranged to be temporarily accessible on the mobile device when the mobile device detects event information for the designated event; instructions operable to install a preliminary data-gathering temporary app on the mobile device upon detection of the event information for the designated event; instructions operable to run the preliminary data-gathering temporary app to gather data associated with but not the same as the event information for the designated event from the mobile device and transmit the data to a cloud server, which causes the cloud server to offer a temporary app to the mobile device; instructions operable to receive an action from a user of the mobile device at the GUI; and instructions operable to display a temporary app panel on the GUI in response to the user action, the temporary app panel displaying the temporary app.

16. The nontransitory computer readable storage medium of claim 15 wherein:
    the temporary app panel displays at least one temporary app indicator that represents the at least one temporary app, respectively, each temporary app indicator providing an option for launching an associated temporary app.

17. The nontransitory computer readable storage medium of claim 16 wherein:
    the at least one temporary app is a plurality of temporary apps, which are represented in the temporary app panel by a plurality of temporary app indicators, respectively; and
    all the temporary app indicators that are displayed in the temporary app panel represent temporary apps that were installed at the mobile device in response to the same designated event detected by the mobile device.

18. The nontransitory computer readable storage medium of claim 16 wherein temporary app indicators appear and disappear from the temporary app panel based on changes in events detected by the mobile device.

19. The nontransitory computer readable storage medium of in claim 16 wherein:
    the at least one temporary app is a plurality of temporary apps, which are represented in the temporary app panel by a plurality of temporary app indicators, respectively; and
    each of the temporary apps involve a particular location and at least one selected from the group consisting of: 1) an application for displaying a map of the location; 2) an application for offering a commercial deal for a business in the location; 3) an application for a retailer in the location; and 4) an application for comparing goods and services in the location.

20. A mobile device comprising:
    at least one storage unit, the storage unit including a nontransitory computer readable medium recited in claim 15; and
    at least one processor that is arranged to execute the computer instructions in the computer readable medium.

21. The method of claim 1 wherein the designated event detected by the mobile device involves a boolean combination referencing at least one selected from the group consisting of: (1) the mobile device detecting that the mobile device is in a particular location, (2) the mobile device detecting a particular time range; (3) the mobile device detecting that a certain type of user data is stored on the mobile device; (4) the mobile device detecting a particular physical characteristic in an environment around the mobile device; (5) the mobile device detecting a particular speed at which the mobile device is traveling; (6) the mobile device detecting a particular update from an information provider; (7) the mobile device detecting a particular shopping preference; (8) the mobile device detecting a particular vendor preference; (9) contextual information; (10) user preferences; and (11) sensor data obtained by the mobile device.

22. The nontransitory computer readable storage medium of claim 9 wherein the designated event detected by the mobile device involves a boolean combination referencing at least one selected from the group consisting of: (1) the mobile device detecting that the mobile device is in a particular location, (2) the mobile device detecting a particular time, (3) the mobile device detecting that a certain type of user data is stored on the mobile device; (4) the mobile device detecting a particular physical characteristic in an environment around the mobile device; (5) the mobile device detecting a particular speed at which the mobile device is traveling; (6) the mobile device detecting a particular update from an information provider; (7) the mobile device detecting a particular shopping preference; (8) the mobile device detecting a particular vendor preference; (9) contextual information; (10) user preferences; and (11) sensor data obtained by the mobile device.

* * * * *